Dec. 6, 1955  W. K. ERGEN  2,726,038
ELECTRONIC DIGITAL COMPUTERS
Filed May 18, 1948
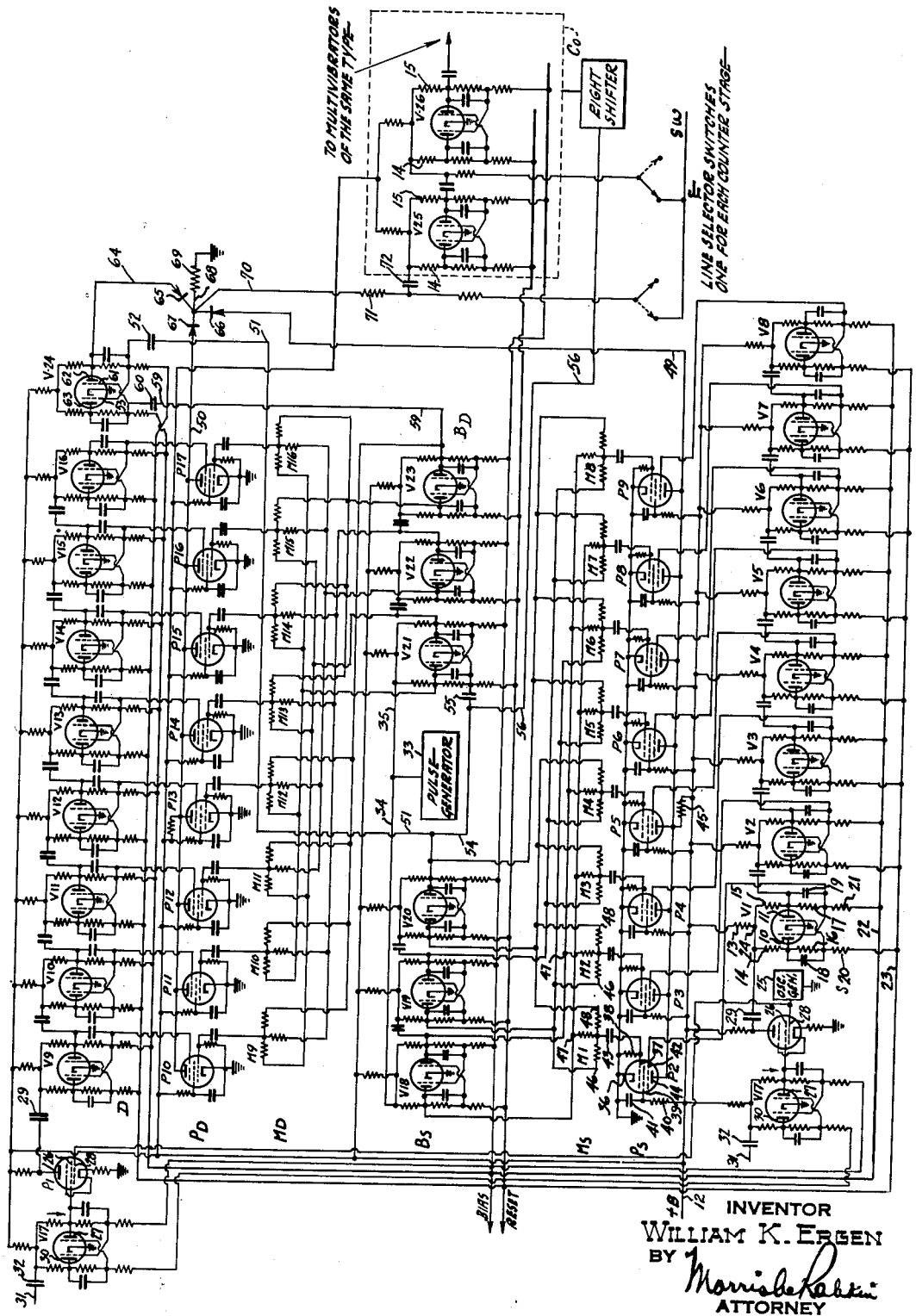
INVENTOR
WILLIAM K. ERGEN
BY
ATTORNEY

United States Patent Office 2,726,038
Patented Dec. 6, 1955

2,726,038

ELECTRONIC DIGITAL COMPUTERS

William K. Ergen, Oak Ridge, Tenn., assignor, by mesne assignments, to the United States of America as represented by the Secretary of the Air Force Application May 18, 1948, Serial No. 27,777

7 Claims. (Cl. 235—61)

This invention relates to electronic digital multipliers, and is based on binary counter chains which are set up according to the factors to be multiplied. These chains are scanned simultaneously and a pulse is generated every time a counter stage in the binary 1 state is scanned. The coincidences of two such pulses are counted in an output counter.

The digital multiplier of the present invention functions to evaluate the product of two factors S and D. It is based on the binary system, where the numbers S and D are expressed by $$S = \sum_{i=0}^{n} s_i 2^i \quad (1)$$

$$D = \sum_{i=0}^{n} d_i 2^i \quad (2)$$

The coefficients $s_i$ and $d_i$ are either 1 or 0.

More specifically, the device refers to a straight line computer for an aircraft navigational system known as Shoran Reconnaissance. The Shoran system measures the distance $r_1$ of an aircraft from a base station $S_1$ and it likewise measures the distance $r_2$ of the same craft from another base station $S_2$. The distance measurements are carried out by measuring the time intervals required for pulses of electromagnetic energy to travel from the aircraft to the base station and back.

The present device is based on a modification of Shoran, which consists in measuring the above named time intervals by means of electronic counters. Each counter contains a chain of multivibrator circuits or stages and every stage has two stable states. One of these states is called the "1-state" and the other state is the "0-state."

The time intervals are measured in units determined by the crystal frequency in the counter, and with special high speed counters these units may be $10^{-7}$ seconds, corresponding to about $\tfrac{1}{100}$ mile in distance. The number of units in the time interval or distance to be measured can then be expressed in the binary system, in analogy to (1) and (2). Each stage in each chain corresponds to one of the powers $2^i$. The stage is in the 1-state or the 0-state dependent on whether the corresponding coefficient of $2^i$ is one or zero.

Instead of measuring the distances $r_1$ and $r_2$ it is proposed to measure $S = r_1 + r_2$, and $D = r_2 - r_1$. ($r_2$ is assumed to be greater than $r_1$, which always can be accomplished since it is arbitrary which station is called $S_1$ and which is $S_2$.) The sum S can be obtained easily by starting the counter by the pulse emitted from the aircraft, stopping it by the pulse returning from $S_2$, starting it again, without resetting, by the pulse emitted from the craft, and stopping it when this pulse returns from $S_1$. The difference can be obtained in an analogous way, with the only modification that $r_1$ is subtracted from, rather than added to, $r_2$. Or, if $S_1$ and $S_2$ are interrogated simultaneously the counter can be started by the pulse returning from $S_1$ and stopped by the pulse returning from $S_2$.

In any case, there will be one chain, the S-chain, the stages of which are in the 1-state or 0-state dependent on the coefficients $s_i$ of the binary expression (1) for the sum $r_1 + r_2$. There is also another chain, the D-chain, the stages of which are in the state prescribed by the coefficients $d_i$ of the binary expression (2) for the difference $r_2 - r_1$.

The purpose of the computer of the present invention consists in determining whether the craft is on a predetermined straight line. The possible straight lines are confined to those perpendicular to the line between the two base stations. The equation of these perpendicular lines is a quadratic equation in the bipolar coordinates $r_1$ and $r_2$, whereas the equation of a straight line in bipolar coordinates is, in general, a quartic equation. The quadratic equation of the perpendicular lines is $$r_2^2 - r_1^2 = A$$

or $$SD = A \quad (3)$$

where $$A = \sum_{k=0}^{q} a_k 2^k \quad (4)$$

is a predetermined constant depending on the distance between the two base stations and on the distance of one base station from the desired line.

Briefly, the computer functions to determine whether the craft is on the desired straight line, or, mathematically speaking whether (3) is fulfilled. The determination is made on the basis of the information set into S- and D- chains of multivibrators.

There are two "printer chains" $P_S$ and $P_D$ associated with the counter chains S and D. These "printer chains" consist of type 6AS6 tubes each of which is connected to one multivibrator of S or D. The 6AS6 tube is completely blocked if the corresponding multivibrator is in the 0-state, but if the multivibrator is in the 1-state, then the 6AS6 can be unblocked by a sufficiently positive voltage on the control grid. The main purpose of the tubes of these printer chains consists in controlling the current through a set of styluses (not shown), which rest on facsimile paper. Each 6AS6 tube controls one stylus. If current flows through one of these styluses a dot is made on the paper. Thus, if positive voltage is applied to the control grids of the 6AS6 tubes, dots will be printed by those styluses, which are controlled by a 6AS6 tube, which is connected to a multivibrator in the 1 position. No dots will be made by the blocked 6AS6 tubes, that are those which correspond to multivibrators in the zero position. Thus the binary numbers S and D are printed on the facsimile paper. These printing styluses and their operating elements are not shown for the reason that they are not a part of the present invention.

The printer chains can also be used for computing purposes, and it is a primary aim of the present invention to accomplish the computing with a minimum of additional tubes.

The principal object of the invention is the provision of an improved device and method of operation whereby the product of two factors is readily obtained or compared with a given number. Additional objects are the provision of a computer which functions to determine whether an aircraft or object is moving along a predetermined straight line, and the provision of improved means for scanning the values set into a plurality of different counter chains.

The invention will be better understood from the following description considered in connection with the accompanying drawing and its scope is indicated by the appended claims.

The single figure of the drawing is, for the most part, a wiring diagram of the improved straight line computer of the present invention.

In this figure are shown (1) and S counter including trigger circuits V1 to V8 which are connected in tandem, that is, in cascade, and on which is established the value $r_2+r_1$, and (2) a D counter including trigger circuits V9 to V16 which are connected in cascade and on which is established the value of $r_2-r_1$.

The trigger circuits V1 to V16 are each of a well known type including a pair of triodes which (1) have their common cathode grounded, (2) have operating potential applied to their anodes 10 and 11 from a +B lead 12 through a common resistor 13 and separate resistors 14 and 15, (3) have the anode of each triode connected to the grid of the other through a resistor 16 or 17 which is shunted by a capacitor 18 or 19, and (4) have bias potential applied to their grids through a resistor 20 or 21 from a lead 22 or 23. The above numerals are applied only to the circuit V1 but it will be understood that they would be analogous for the other trigger circuits V2 to V16. By making the lead 23 momentarily more positive than the lead 22, the trigger circuits V1 to V16 may be established in their zero count or standby condition with current conduction in the right hand triode of each trigger circuit.

As is well known, such trigger circuits are stable with current conduction in either of their anodes, and current conduction is transferred from one to the other of the anodes in response to the application of a negative potential pulse to the junction point 24 between the common anode resistor 13 and the separate anode resistors 14 and 15. These negative pulses are applied to V1 and V9 through a coupling capacitor 29, and each of the following stages (V2–V8, V10–V16) obtains the negative pulse through a coupling capacitor from the preceding stage. For ease of understanding, it should be remembered that (1) the counters S and D evaluate the quantities S and D in the binary numerical system, since each stage receives one negative pulse for every two such pulses applied to the preceding stage, (2) each of the trigger circuits V1 to V16 is in a binary 0 condition when current conduction is in its right anode and is in a binary 1 condition when current conduction is in its left anode, and (3) the numbers or values established in the counters are to be read from right to left. For example, with trigger circuits V1, V4, V6 and V7 in a binary 1 condition, and V2, V3, V5, and V8 in the 0 condition the established binary value is 01101001 which is equal to 105 in the decimal numerical system.

The negative pulses counted by the counters V1 to V8 and V9 to V16 are supplied from an oscillation generator 25. The circuits by which the supply of such negative pulses to each counter is controlled are of the same design. Thus, each of the control circuits includes a trigger circuit V17 of the type previously described and a pentode P1 which has one of its grids 26 connected to the anode 27 of the trigger circuit V17 and has its other grid 28 connected to the oscillation generator 25. With these connections, oscillations are supplied through the coupling capacitor 29 to the point 24 of the multivibrators V1 or V9 only when current conduction is in the anode 30 of the trigger circuit V17.

Negative pulses for operating the control circuit are applied through a lead 31 and a coupling capacitor 32.

Thus, in the case of the S counter, a negative pulse is applied to the lead 31 when a first pulse is transmitted from the aircraft, a negative pulse is applied to the lead 31 when this first pulse is returned from the station $S_1$ to the aircraft, a negative pulse is applied to the lead 31 when a second pulse is transmitted from the aircraft, and a negative pulse is applied when this second pulse is returned from the statiton $S_2$ to the aircraft. As a result, the number of constant frequency pulses counted by the S counter is proportional to $r_2+r_1$, which is the sum of the distances from the aircraft to the two stations $S_1$ and $S_2$.

The operation of the D counter is similar to that of the S counter with the exception that the negative pulses applied to its input lead 31 are such as to establish in it a count proportional to $r_2-r_1$ which is the difference between the distances from the aircraft to the two stations.

The values thus set into the S counter are scanned through the medium of (1) a printer chain $P_S$ which includes the pentodes P2 to P9, (2) a matrix chain $M_S$ which includes the Y-connected networks M1 to M8, and a scanning chain $B_S$ which includes the trigger circuits V18 to V20.

The values set into the D counter are scanned through the medium of a printer chain $P_D$, a matrix chain $M_D$ and a scanning chain $B_D$.

Pulses for operating the scanning chains $B_S$ and $B_D$ are supplied from a generator 33 through a lead 34 to the common anode resistor terminal of the trigger circuit V18 and through a lead 35 to a similar point of the trigger circuit V21. As explained below, the connections between the scanning chains and the Y-connected matrix networks are such that the S counter is scanned in one direction and the D counter is scanned in the opposite direction.

Each of the printer chain pentodes P2 to P17 includes (1) a cathode 36 which is grounded, (2) a grid 37 which is connected to ground through a suitable resistor 38 and to the common terminal of one of the Y-connected networks through a suitable capacitor 43, (3) a screen grid 39 which is connected to the common terminal of a resistor 40 and a capacitor 41, (4) a suppressor grid 42 which is connected through one of the resistors (for example, the resistor 17) to one of the anodes (the anode 11) of the counter chains, and (5) an anode 44 which is connected through a common anode resistor 45 to the +B lead 12. (Numerals are shown only for the pentode P2 but apply similarly to the pentodes P3–P17.)

With these connections, each of the pentodes P2 to P17 conducts only when (1) the trigger circuit to which its grid 42 is connected is in a binary (1) condition and (2) the outer terminals 46, 47 and 48 (these numerals are only shown for M1, but apply to the other networks M2–M16 as well) of the corresponding Y-connected network are all at their most positive potential.

When any of the pentodes P2 to P9 conduct current, a negative pulse is produced at a lead 49 due to the voltage drop of the resistor 45. When any of the pentodes P10 to P17 conduct current, a similar negative pulse is produced at a lead 50. From this, it follows that the leads 49 and 50 are simultaneously negative only when the simultaneously scanned trigger circuits of the S and D counters are in a binary 1 condition i. e. when current conduction occurs in the left hand anodes of such trigger circuits.

The connections between the scanner chain $B_S$ and the matrix network chain $M_S$ are such that the S counter chain is scanned in a direction from the lowest order (V1) to the highest order (V8). The connections between the scanner chain $B_D$ and the matrix network chain $M_D$ are such that the D counter is scanned from the highest order (V16) to the lowest order (V9).

For example, when current conduction goes over to the right hand anodes of the trigger circuits V18, V19 and V20 of the scanning chains $B_S$, the terminals 46, 47 and 48 of the network M1 are all positive and the trigger circuit V1 is scanned. When the next pulse is applied from the generator 33 through the lead 34 to the common anode resistor terminal of the trigger circuit V18, current conduction is transferred to its left anode, the terminals 46, 47, and 48 of the matrix network M2 are all positive and the trigger circuit V2 is scanned. In a similar way, the trigger circuits V1 up to V8 are successively scanned and the trigger circuits V16 down to V9 are successively scanned.

It will be noted that the right hand anode of the trigger circuit V20 is connected (1) through a lead 51 and a capacitor 52 to the grid 53 of a trigger circuit V24, (2) through a lead 54 and a capacitor 55 to the right hand grid of the trigger circuit V21 and (3) through a lead 56 to a right shifting device referred to hereinafter.

The right hand anode of the trigger circuit V23 is connected through a lead 59 and a capacitor 60 to the right hand grid 61 of the trigger circuit V24 which is like the trigger circuits V1 to V23 previously considered. As a result, the trigger circuit V24 has current conduction transferred (1) to its anode 62 when the right hand triode of the trigger circuit V20 takes current and (2) to its anode 63 when the right hand anode of the trigger circuit V23 takes current.

It will be noted that the anode 62 is connected through a lead 64 to the anode of a rectifier 65, that the leads 49 and 50 are similarly connected to the anodes of rectifiers 66 and 67 and that the cathodes of these three rectifiers have a common lead 68 which is connected to ground through a resistor 69.

When any of the leads 49, 50 or 64 is at a positive potential, the input capacitor 72 of the $C_0$ counter is charged. When all the leads 49, 50, and 64 are negative, (1) the capacitor 72 is discharged through the resistor 71, the lead 70 and the resistor 69, (2) a negative pulse is produced at the common anode resistor terminal of the trigger circuit V25 and (3) a count of binary 1 is set up in the counter $C_0$.

The Equation (3) may be written, using (1), (2) and (4)

$$\sum_{k=0}^{q}\left(\sum_{i+j=k} s_i d_j\right) 2^k = \sum_{k=0}^{q} a_k 2^k \quad (5)$$

Since $s_i$ and $d_j$ are either 1 or 0, the product $s_i d_j$ is equal to 1, if both $s_i$ and $d_j$ are equal to 1. If either $s_i$ or $d_j$, or both, are 0, then $s_i d_j$ is zero. The coefficient of $2^k$ on the left side of (5) is the number of non-vanishing products $s_i d_j$ with $i+j=k$, or, in other words, the number of such products in which neither $s_i$ nor $d_j$ vanishes.

Electronically, the chains $P_S$ and $P_D$ are scanned in such a way that the tube corresponding to $s_i$ is scanned simultaneously with the tube corresponding to $$d_j (i+j=k)$$

Then, one counts the number of coincidences, in which both the $s_i$ and $d_j$ were equal to one.

The output counter $C_0$ counts the number of such coincidences. This is accomplished by means of the two crystal rectifiers 66 and 67. If either of the leads 49 or 50 is at high positive potential, the lead 70 will be at the same potential as the crystals conduct in the direction 49 to 70 and 50 to 70, but not in the opposite direction. However, if both 49 and 50 go more negative, due to a coincidence of negative pulses from the leads 49 and 50, then the high resistor 69 will discharge the coupling condenser 72 and a negative pulse will enter $C_0$.

The function of the trigger circuit V24 and the rectifier 65 will be illustrated by the example $k=i+j=10$. In the following table, each vertical column gives the $i$ and $j$ values which are scanned simultaneously:

| $i$ | 0 | 1 | 2 | 3 | 4 | 5 | 6 | 7 |
|---|---|---|---|---|---|---|---|---|
| $j$ | 2 | 1 | 0 | 7 | 6 | 5 | 4 | 3 |

Evidently, the scanning of the $i$ and $j$ values on the right of the vertical line is what gives the desired result, as the $i$ and $j$ values add up to 10. However, on the left of the vertical line, the $i$ and $j$ values add up to 2, and some means have to be provided to block out the counter $C_0$ while the $i$ and $j$ values on the left of the vertical line are scanned. This is accomplished by the trigger circuit V24 and the rectifier 65.

The trigger circuit V24 has two stable states. In one of these states, it makes the anode of the rectifier 65 positive, and, even if there is a coincidence between two pulses out of the $P_D$ and $P_S$ chains, this will prevent a negative pulse from going into $C_0$. Thus, in this state of the trigger circuit V24, $C_0$ is blanked out. In the other state of the trigger circuit 24, the cathode of the rectifier 65 is relatively negative and a pulse can enter $C_0$.

The transition of the trigger circuit 24 from one of its stable states into the other is caused by the negative pulses obtained from the scanner chains $B_S$ and $B_D$ as previously explained. More specifically these pulses are obtained from the tubes most to the right of each of these chains, and they occur when the right half of the tube goes from the blocked to the unblocked state. Thus one such pulse occurs when $i$ goes from 7 to 0 and the other when $j$ goes from 0 to 7.

The operation starts with the highest $k$ (14), and then goes successively to lower $k$. In order to lower $k$ by one unit, the above mentioned pulse which is generated after $i=7$ is scanned, is also fed to the input of the scanning chain $B_D$. This advances the latter chain by 1 unit, without affecting the chain $B_S$. The just mentioned pulse at the output of chain $B_S$ occurs somewhat later than the pulse which is fed to the input of this chain and which is one of the pulses at the output of the generator 33. This delay is due to the time constants in the chain. The delay is used to avoid interference of the pulse from the output of $B_S$ with the other pulses fed into $B_D$. Of course, the delay should not be so large that the pulse at the output of $B_S$ occurs simultaneously with, or later than, the next pulse fed into $B_D$.

Thus, the $i$ and $j$ values are scanned in the following order with the counter $C_0$ blanked out while the numbers in the boxes are scanned:

| $i$ | 0123456 | 7 | 012345 | 67 | 01234 | 567 | 0123 | 4567 | 012 | 34567 | 01 | 234567 | 0 |
| $j$ | 6543210 | 7 | 543210 | 76 | 43210 | 765 | 3210 | 7654 | 210 | 76543 | 10 | 765432 | 0 |

| $i$ | 1234567 | 01234567 | 0123456 | 7 | 012345 | 67 |
| $j$ | 7654321 | 76543210 | 6543210 | 7 | 543210 | 76 |

$x$              $y$ and so on.

The transition at point $x$ is as follows: While $i$ goes from 7 to 0, a negative pulse is generated which blanks out $C_0$. $j$ is simultaneously reduced by one unit, which gives $j=0$. The negative pulse from $B_S$ advances $j$ another unit, to $j=7$, and that generates another negative pulse, which unblocks $C_0$. At point $y$, two pulses are fed to the trigger circuit V24, one originating in $B_S$ by the transition from 7 to 0, and the other originating in $B_D$ from the transition from 0 to 7. These pulses have to be somewhat separated in time in order to allow the trigger circuit V24 to flip over and back.

Simultaneously with the advancing of the chain $B_D$, the pulse from the output of $B_S$ also operates through the lead 56 a "right shifting device" which transfers the information set into a stage, or tube, of $C_0$ into the next higher order stage, or tube, to the right in this chain. Thus, if a tube in $C_0$ is in the 1-state before the right shifting occurs, the tube next to the right will be in the 1-state after the right shifting. Similarly, a zero state in one of the tubes of $C_0$ causes the next tube to the right to go to zero after the right shifting. Various right shifting devices are known to the art, and they are not part of the invention.

Instead of introducing $A$ directly, it is best to use $$B = \sum_{k=0}^{q} b_k 2^k = K - A$$

where $K$ is the number of pulses which return the counter $C_0$ to its original position. (For an $n$-stage binary counter, $K=2^n$).

The $b_k$ are introduced by means of the switches $S_w$, each switch corresponds to one $b_k$. The switches corresponding to $b_k=1$ are connected to the bus bar E and those corresponding to $b_k=0$ are open. A negative pulse is applied to E, and thus one unit is fed into each multivibrator of $C_0$ which corresponds to a $b_k=1$. This is done at the end of the operation during which the product SD is set into the counter.

Then, in effect, the output counter is set to $SD+B$, or $SD-A+K$. Since K just runs the counter through once, it does not affect the reading, and the counter setting is equivalent to $SD-A$. This should be zero if the craft is on the desired straight line, and Equation 3 is fulfilled. A suitable indicator, for instance one involving the familiar neon lamps connected across the resistors 15 of the multivibrator circuits V25, V26, etc., may be used to indicate this fact.

What the invention provides is a straight line computer which (1) is based on a navigation system wherein printer chains are utilized to record the positional data of a moving object and (2) functions to provide a visual indication of such positional data.

What is claimed is:

1. The combination of first and second counters each including a plurality of stages which are connected in cascade and are operable to either a binary 0 or binary 1 condition, means for establishing a first count in said first counter and a second count in said second counter, first and second scanning chains each including a plurality of cascade connected stages, means interconnecting said first scanning chain with said first counter to produce a pulse in response to the scanning of each stage of said first counter which is in a binary 1 condition, means interconnecting said second scanning chain and said second counter to produce a pulse in response to the scanning of each stage of said second counter which is in a binary 1 condition, and means responsive to a coincidence of and connected to receive said pulses.

2. The combination of first and second counters each including a plurality of stages which are connected in cascade and are operable to either a binary 0 or binary 1 condition, means for establishing a first count in said first counter and a second count in said second counter, first and second scanning chains each including a plurality of cascade connected stages, means interconnecting said first scanning chain with said first counter to produce a pulse in response to the scanning of each stage of said first counter which is in a binary 1 condition, means interconnecting said second scanning chain and said second counter to produce a pulse in response to the scanning of each stage of said second counter which is in a binary 1 condition, an output counter, and means responsive to said pulses and to predetermined conditions of said scanning chains for establishing in said output counter a count which is equal to the product of said first and second counts.

3. The combination of first and second counters each including a plurality of stages which are connected in cascade and are operable to either a binary 0 or binary 1 condition, means for establishing a first count in said first counter and a second count in said second counter, first and second scanning chains each including a plurality of cascade connected stages, means interconnecting said first scanning chain with said first counter to produce a negative pulse in response to the scanning of each stage of said first counter which is in a binary 1 condition, means interconnecting said second scanning chain and said second counter to produce a negative pulse in response to the scanning of each stage of said second counter which is in a binary 1 condition, a first rectifier connected to have applied to its anode the negative pulses produced by the scanning of said first counter, a second rectifier connected to have applied to its anode the negative pulses produced by the scanning of said second counter, a trigger circuit operable to a first current conductive condition in response to each completion of the operating cycle of said first scanning chain and to a second current conducting condition in response to each completion of the operating cycle of said second scanning chain, a third rectifier connected to have a negative potential applied to its anode only when said trigger circuit is in said second current conductive condition, means responsive to each completion of the operating cycle of said first scanning chain for changing the state of said second scanning chain by one digital position, an output counter, and means interconnecting the cathodes of said rectifiers with the input of said output counter to apply a negative pulse thereto only when all the anodes of said rectifiers are at a negative potential.

4. The combination of first and second counters each including a plurality of stages which are connected in cascade and are operable to either a binary 0 or binary 1 condition, means for establishing a first count in said first counter and a second count in said second counter, first and second scanning chains each including a plurality of cascade connected stages, means interconnecting said first scanning chain with said first counter to produce a negative pulse in response to the scanning of each stage of said first counter which is in a binary 1 condition, means interconnecting said second scanning chain and said second counter to produce a negative pulse in response to the scanning of each stage of said second counter which is in a binary 1 condition, a first rectifier connected to have applied to its anode the negative pulses produced by the scanning of said first counter, a second rectifier connected to have applied to its anode the negative pulses produced by the scanning of said second counter, a trigger circuit operable to a first current conductive condition in response to each completion of the operating cycle of said first scanning chain and to a second current conducting condition in response to each completion of the operating cycle of said second scanning chain, a third rectifier connected to have a negative potential applied to its anode only when said trigger circuit is in said second current conductive condition, means responsive to each completion of the operating cycle of said first scanning chain for changing the state of said second scanning chain by one digital position, an output counter, means interconnecting the cathodes of said rectifiers with the input of said output counter to apply a negative pulse thereto only when all the anodes of said rectifiers are at a negative potential, and means responsive to each completion of the operating cycle of said first scanning chain for initiating an operation, after which each individual stage of said output counter is in the binary 0 or 1 condition, depending on whether the stage of order next lower to that of said individual stage was, before the operation, in the 0 or 1 condition.

5. The combination of first and second counters each including a plurality of stages which are connected in cascade and are operable to either a binary 0 or binary 1 condition, means for establishing a first count in said first counter and a second count in said second counter, means operable to scan said first and second counters so that the orders of said counters are scanned in opposite directions, an output counter, and means responsive to said scanning means for producing in said output counter a count which is equal to the product of said first and second counts.

6. The combination of a counter including a plurality of stages which are connected in tandem and are each operable to a binary 0 and a binary 1 condition, a pentode chain including a plurality of pentodes having operating potential applied to their anodes through an impedance element common to all of said anodes, means interconnecting each of said counter stages with a first grid of a different one of said pentodes so that a positive potential is applied to said first grid only when the stage to which it is connected is in a binary 1 condition, a scanning chain including a plurality of stages which are connected in cascade and are each operable to either of two current conductive conditions, and a matrix chain including a plurality of networks each having one terminal connected to a second grid of a different one of said pentodes and having other terminals connected to said scanning chain so that the stages of said counter are successively scanned in response to one operating cycle of said scanner chain.

7. The combination of a counter including a plurality of stages which are connected in cascade and are each operable to a binary 0 and a binary 1 condition, a pentode chain including a plurality of pentodes having operating potential applied to their anodes through an impedance element common to all of said anodes, means interconnecting each of said counter stages with a first grid of a different one of said pentodes so that a positive potential is applied to said first grid only when the stage to which it is connected is in a binary 1 condition, a scanning chain including a plurality of stages which are connected in cascade and are each operable to either of two current conductive conditions, a matrix chain including a plurality of networks each having one terminal connected to a second grid of a different one of said pentodes and having other terminals connected to said scanning chain so that the stages of said counter are successively scanned in response to one operating cycle of said scanner chain, and an output lead which is common to the anodes of said pentodes and at which a negative pulse is produced in response to each scanning of a counter stage in a binary 1 condition.

References Cited in the file of this patent

UNITED STATES PATENTS

| | | |
|---|---|---|
| 2,404,047 | Flory | July 16, 1946 |
| 2,404,697 | Desch | July 23, 1946 |
| 2,409,689 | Morton | Oct. 22, 1946 |
| 2,429,227 | Herbst | Oct. 21, 1947 |
| 2,436,963 | Grosdoff | Mar. 2, 1948 |
| 2,445,215 | Flory | July 13, 1948 |